(12) United States Patent
Biskeborn et al.

(10) Patent No.: US 8,670,210 B2
(45) Date of Patent: Mar. 11, 2014

(54) MAGNETIC WRITER HAVING MULTIPLE GAPS WITH MORE UNIFORM MAGNETIC FIELDS ACROSS THE GAPS

(71) Applicant: International Business Machines Corporation, Armonk, NY (US)

(72) Inventors: Robert G. Biskeborn, Hollister, CA (US); Philipp Herget, San Jose, CA (US); Bucknell C. Webb, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/734,838

(22) Filed: Jan. 4, 2013

(65) Prior Publication Data
US 2013/0120872 A1    May 16, 2013

Related U.S. Application Data

(63) Continuation of application No. 12/611,294, filed on Nov. 3, 2009, now Pat. No. 8,385,018.

(51) Int. Cl.
*G11B 5/265* (2006.01)
(52) U.S. Cl.
USPC .......................................... 360/121
(58) Field of Classification Search
USPC ........................ 360/121, 317, 319
See application file for complete search history.

(56) References Cited

U.S. PATENT DOCUMENTS

| | | | |
|---|---|---|---|
| 3,855,630 A * | 12/1974 | Koorneef et al. | 360/119.01 |
| 3,964,103 A | 6/1976 | Thompson et al. | |
| 4,110,804 A | 8/1978 | Castrodale et al. | |
| 4,115,827 A * | 9/1978 | Gooch | 360/121 |
| 4,387,410 A | 6/1983 | Takanohashi et al. | |
| 4,621,296 A | 11/1986 | Komagata | |
| 4,698,711 A | 10/1987 | Vinal | |
| 4,758,917 A | 7/1988 | Gooch | |

(Continued)

FOREIGN PATENT DOCUMENTS

EP    0 110 513 A2    6/1984
JP    55032284 A    3/1980

OTHER PUBLICATIONS

International Search Report and Written Opinion from PCT Application No. PCT/EP2010/063342 mailed Dec. 3, 2010.

(Continued)

*Primary Examiner* — Angel Castro
(74) *Attorney, Agent, or Firm* — Zilka-Kotab, PC

(57) ABSTRACT

A magnetic device according to one embodiment includes a source of flux; a magnetic pole coupled to the source of flux, the magnetic pole having two or more gaps; and a low reluctance path positioned towards at least one of the gaps and not positioned towards at least one other of the gaps for affecting a magnetic field formed at the at least one of the gaps when the source of flux is generating flux. Other disclosed embodiments include devices having coil turns with a non-uniform placement in the magnetic yoke for altering a magnetic field formed at the at least one of the gaps during writing. In further embodiments, a geometry of the magnetic pole near or at one of the gaps is different than a geometry of the magnetic pole near or at another of the gaps to help equalize fields formed at the gaps when the source of flux is generating flux.

20 Claims, 8 Drawing Sheets

(56) References Cited

U.S. PATENT DOCUMENTS

| | | |
|---|---|---|
| 4,787,002 A | 11/1988 | Isozaki |
| 4,819,107 A * | 4/1989 | Bolt ............................. 360/121 |
| 4,935,832 A | 6/1990 | Das et al. |
| 5,057,957 A | 10/1991 | Ito et al. |
| 5,075,956 A | 12/1991 | Das |
| 5,130,876 A | 7/1992 | Gooch |
| 5,229,904 A | 7/1993 | Ito et al. |
| 5,345,354 A | 9/1994 | Ito et al. |
| 5,729,413 A | 3/1998 | Gooch et al. |
| 6,118,625 A | 9/2000 | Heinz et al. |
| 6,477,002 B1 | 11/2002 | Mizoh |
| 6,477,009 B1 | 11/2002 | Watson et al. |
| 6,717,770 B1 | 4/2004 | Crawford |
| 6,947,256 B2 * | 9/2005 | Biskeborn et al. ....... 360/125.34 |
| 7,031,121 B2 * | 4/2006 | Khera et al. .................. 360/317 |
| 7,322,096 B2 * | 1/2008 | Biskeborn et al. .......... 29/603.16 |
| 7,688,544 B1 * | 3/2010 | Mallary et al. ........... 360/125.06 |
| 8,385,018 B2 * | 2/2013 | Biskeborn et al. ............. 360/121 |
| 2009/0316290 A1 | 12/2009 | Biskeborn et al. |
| 2009/0316291 A1 | 12/2009 | Biskeborn et al. |
| 2011/0102116 A1 | 5/2011 | Biskeborn et al. |

OTHER PUBLICATIONS

Restriction/Election Requirement from U.S. Appl. No. 12/611,294 dated Oct. 28, 2011.

Non-Final Office Action from U.S. Appl. No. 12/611,294 dated Feb. 2, 2012.

Final Office Action from U.S. Appl. No. 12/611,294 dated Jul. 3, 2012.

Notice of Allowance and Fee(s) Due from U.S. Appl. No. 12/611,294 dated Oct. 19, 2012.

* cited by examiner

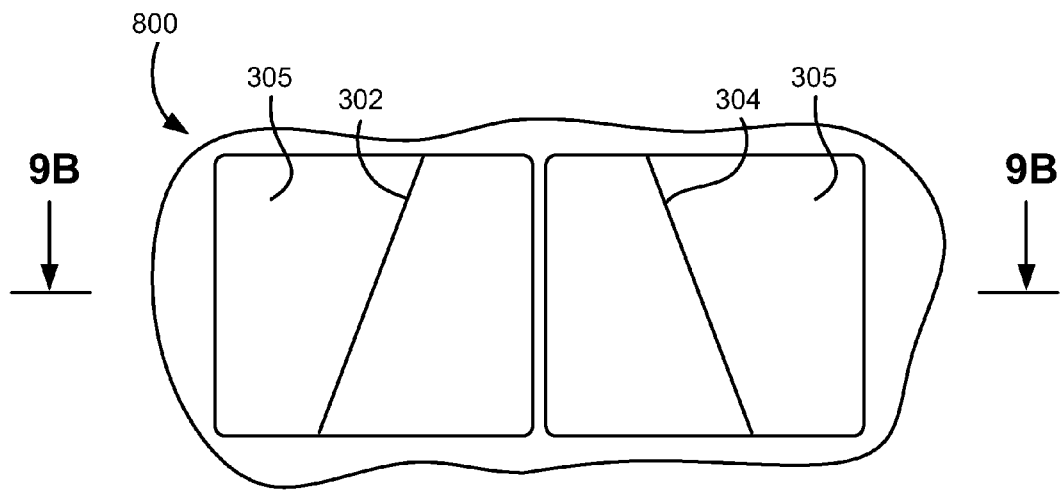
FIG. 9A
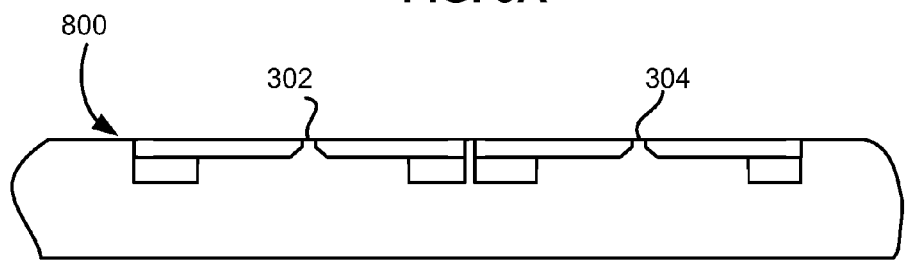
FIG. 9B
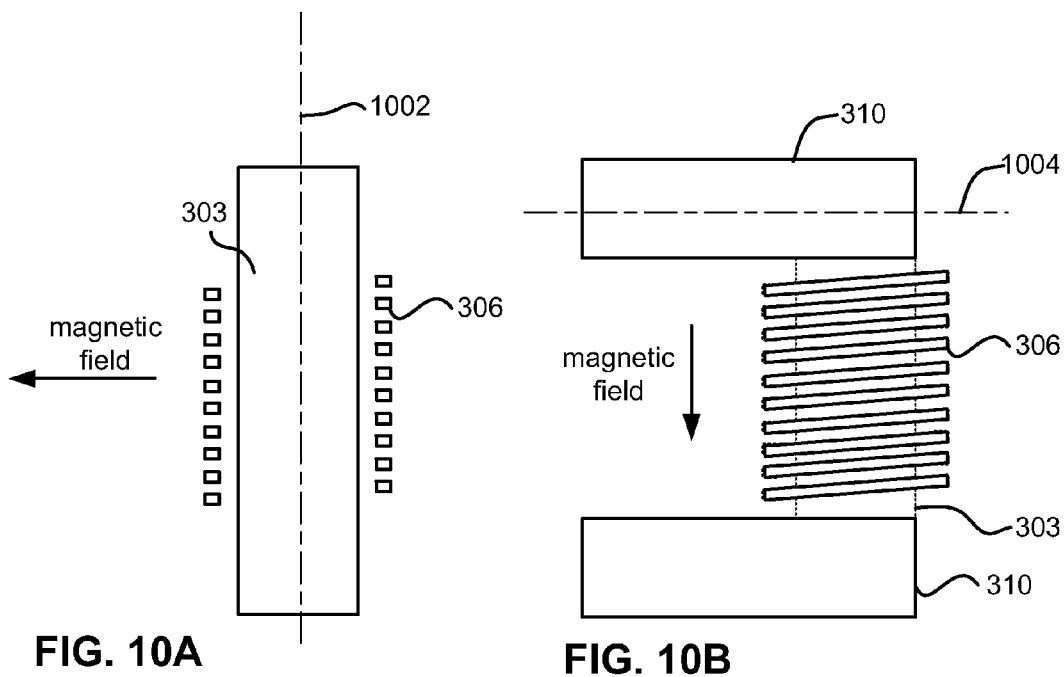
FIG. 10A   FIG. 10B

MAGNETIC WRITER HAVING MULTIPLE GAPS WITH MORE UNIFORM MAGNETIC FIELDS ACROSS THE GAPS

RELATED APPLICATIONS

This application is a continuation of U.S. patent application Ser. No. 12/611,294 filed Nov. 3, 2009, which is herein incorporated by reference.

BACKGROUND

The present invention relates to data storage systems, and more particularly, this invention relates to magnetic write heads having multiple gaps.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track density on recording tape, and decreasing the thickness of the magnetic tape medium. However, the development of small footprint, higher performance tape drive systems has created various problems in the design of a tape head assembly for use in such systems.

SUMMARY

A magnetic device according to one embodiment includes a source of flux; a magnetic pole coupled to the source of flux, the magnetic pole having two or more gaps; and a low reluctance path positioned towards at least one of the gaps and not positioned towards at least one other of the gaps for affecting a magnetic field formed at the at least one of the gaps when the source of flux is generating flux.

A magnetic device according to another embodiment includes a source of flux comprising a coil having multiple turns; and a magnetic yoke coupled to the source of flux, the magnetic yoke having a pole with two or more gaps, wherein the coil turns have a non-uniform placement in the magnetic yoke for altering a magnetic field formed at the at least one of the gaps during writing.

A magnetic device according to yet another embodiment includes a source of flux; and a magnetic pole coupled to the source of flux, the magnetic pole having two or more gaps. A geometry of the magnetic pole near or at one of the gaps is different than a geometry of the magnetic pole near or at another of the gaps to help equalize fields formed at the gaps when the source of flux is generating flux.

Any of these embodiments may be implemented in a magnetic data storage system such as a tape drive system, which may include a magnetic head as recited above, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 9A is a partial tape bearing surface of a tandem head according to one embodiment.

FIG. 9B is a cross sectional view of FIG. 9A taken along Line 9B-9B of FIG. 9A.

FIGS. 10A-C illustrate one method for forming a writer.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic systems, as well as operation and/or component parts thereof. Particularly, disclosed are structures that minimize gap to gap field variations that otherwise would occur in magnetic devices having multiple gaps. While the teachings herein may apply to magnetic devices such as inductors, switches, and magnetic engines of various types, much of the following description is presented in terms of a magnetic recording head. This has been done by way of nonlimiting example only and to aid the reader by placing embodiments of the present invention in a context.

In one general embodiment, a magnetic device includes a source of flux; a magnetic pole coupled to the source of flux, the magnetic pole having two or more gaps; and a low reluctance path positioned towards at least one of the gaps and not positioned towards at least one other of the gaps for affecting a magnetic field formed at the at least one of the gaps when the source of flux is generating flux.

In another general embodiment, a magnetic device includes a source of flux comprising a coil having multiple turns; and a magnetic yoke coupled to the source of flux, the magnetic yoke having a pole with two or more gaps, wherein the coil turns have a non-uniform placement in the magnetic yoke for altering a magnetic field formed at the at least one of the gaps during writing.

In yet another general embodiment, a magnetic device includes a source of flux; and a magnetic pole coupled to the source of flux, the magnetic pole having two or more gaps. A geometry of the magnetic pole near or at one of the gaps is different than a geometry of the magnetic pole near or at another of the gaps to help equalize fields formed at the gaps when the source of flux is generating flux.

Figure 1:
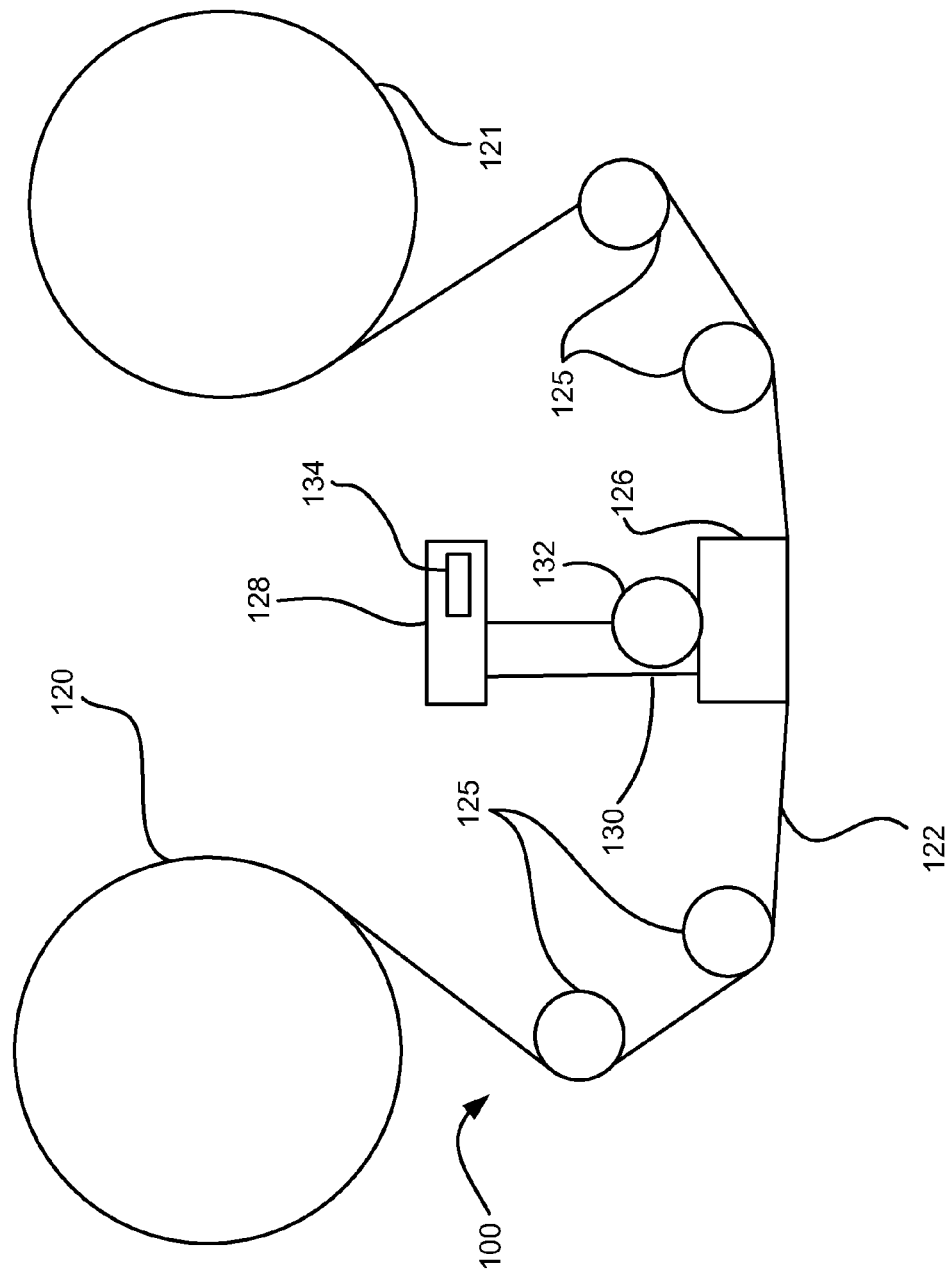
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

The readers and writers in the head 126 may be arranged in a piggyback configuration. The readers and writers may also be arranged in an interleaved configuration. Alternatively, each array of channels may be readers or writers only. Other configurations are also possible. Any of these arrays may contain one or more servo readers.

Some embodiments are constructed to operate with the magnetic medium running along the plane of the wafer. These heads are typically referred to as "planar" heads. Other embodiments are constructed to operate with the magnetic medium running orthogonal to a plane of deposition of its constituent layers.

Figure 2:
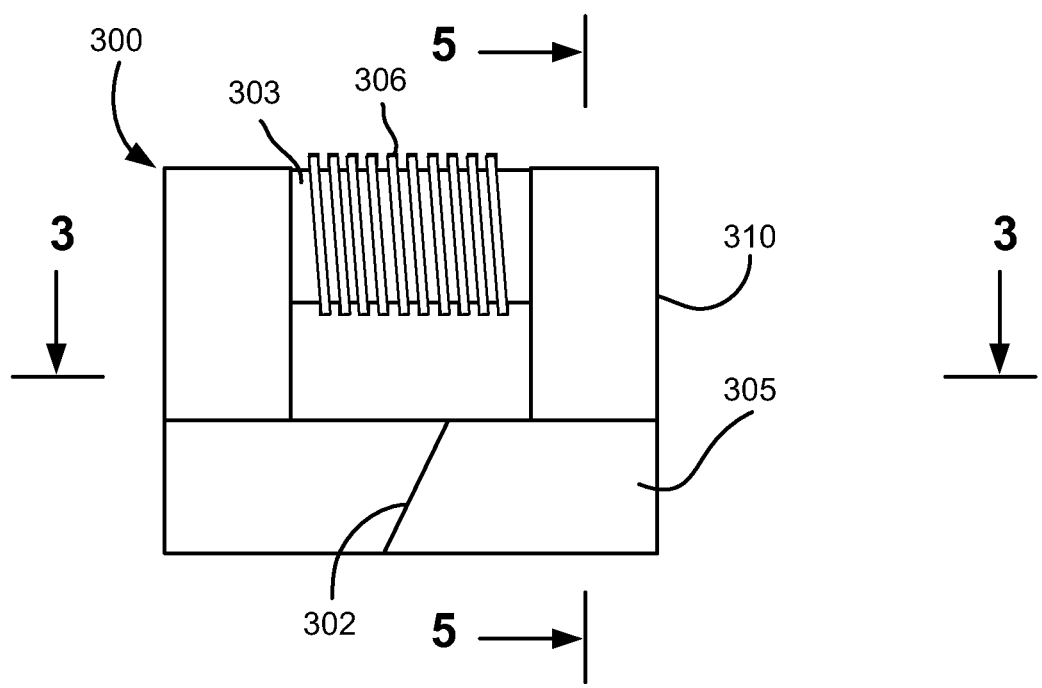
FIG. 2 is a partial tape bearing surface view of a head according to one embodiment.
Figure 3:
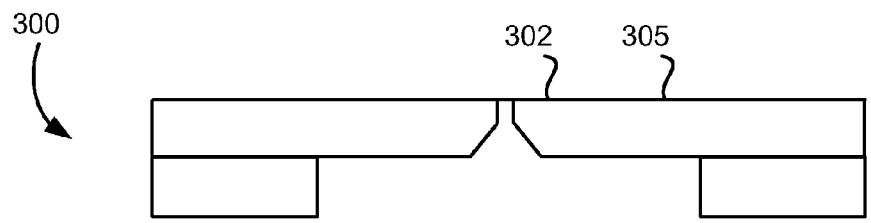
FIG. 3 is a cross sectional view of FIG. 2 taken along Line 3-3 of FIG. 2.
Figure 4:
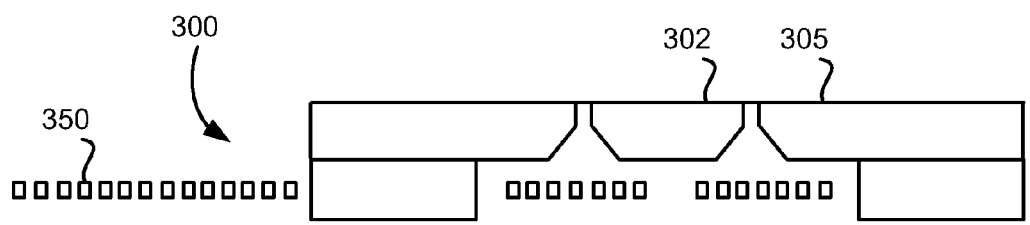
FIG. 4 shows an alternate embodiment having a pancake coil.
Figure 5:
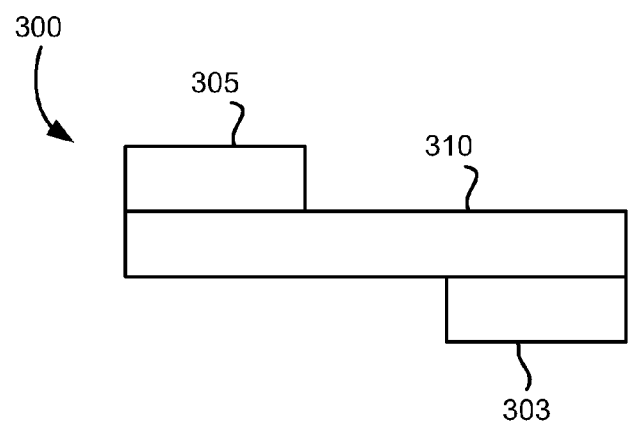
FIG. 5 is a cross sectional view of FIG. 2 taken along Line 5-5 of FIG. 2.

FIG. 2 illustrates a head 300 according to one embodiment. FIG. 3 shows a cross section of FIG. 2 taken along Line 3-3. FIG. 5 shows a cross section of FIG. 2 taken along Line 5-5. As shown in FIGS. 3-5, the head 300 has a top pole 305 with a first write gap 302 therein. The top pole is positioned above a plane extending through the bottom pole 303 and parallel to a plane of deposition of the bottom pole. Side poles 310 connect the top and bottom poles. As best seen in FIG. 5, the top pole is at least partially offset from the bottom pole in a direction parallel to a plane of deposition of the top pole. In one approach, a portion of the top pole does not overlie the bottom pole. In another approach, parallel, central longitudinal axes of the top and bottom poles are offset from one another in a direction parallel to a plane of deposition of the top pole.

The top pole may partially or fully overlie the bottom pole. In other embodiments, the top pole is completely offset from the bottom pole such that the top pole does not overlie the bottom pole. See, e.g., FIG. 5.

The top pole may be constructed of a high moment material such as NiFe alloys, including 45/55 NiFe, or other high moment materials. Illustrative thicknesses of the top pole are between about 0.5 microns and about 3 microns, but could be higher or lower. The top pole may be tapered or shaped as in FIG. 3, 11C, etc. to focus the flux at the gap.

The bottom pole and side poles can be a high permeability material such as permalloy, CZT, etc. The bottom pole may have a lower magnetic moment than the top pole, in which case it would be preferably made wider and/or thicker than the top pole. The same applies to the side poles. The amount of open space created by the offset between the top and bottom poles may be tailored to maximize the head efficiency.

A source of flux such as a first coil 306 generates a magnetic flux across the first write gap, thereby causing a magnetic flux to emanate from the first gap 302.

Figure 10C:
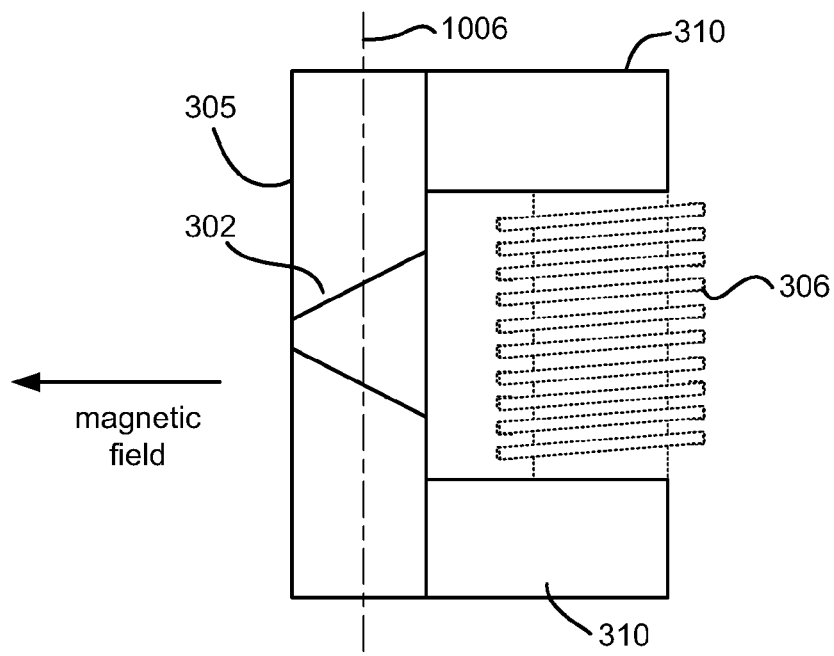

The first coil may be a helical coil or a pancake coil, the helical coil being shown in FIGS. 2 and 10B, and the pancake coil being shown in FIG. 4. As also shown in FIG. 10C, the top pole does not overlie the first coil in some embodiments, but may overlie portions of the coil in other embodiments, e.g., one having a pancake coil. Note that in some embodiments, the source of flux may include multiple coils, including coils that operate simultaneously as well as those that are independently addressable.

Figure 6:
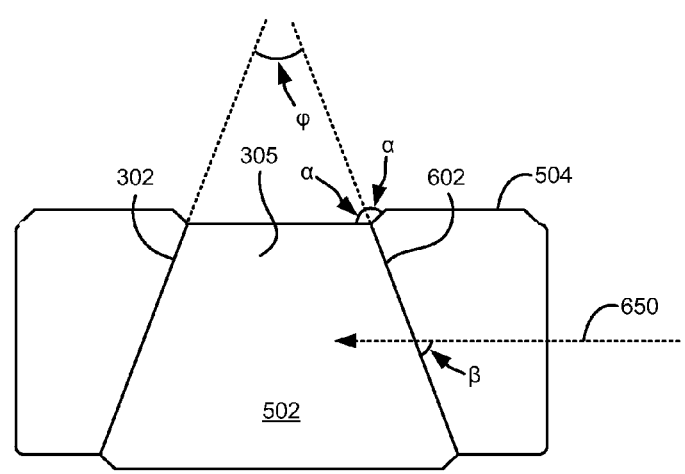
FIG. 6 is a partial tape bearing surface of a head according to one embodiment.
Figure 7:
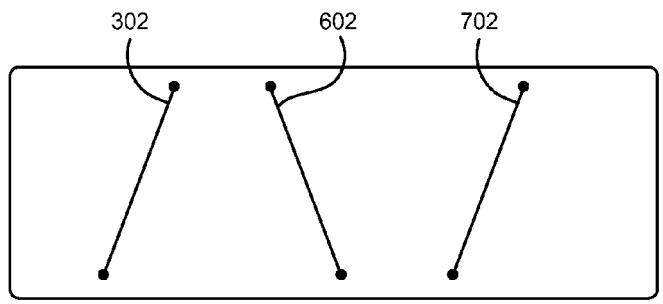
FIG. 7 is a partial tape bearing surface of a head according to one embodiment.
Figure 8:
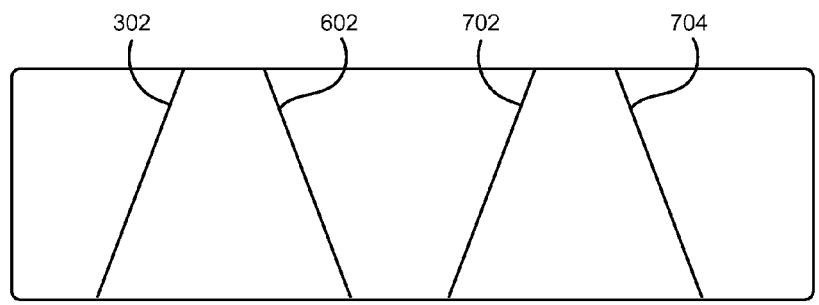
FIG. 8 is a partial tape bearing surface of a head according to one embodiment.

Multiple write gaps are preferably present in some embodiments. Referring to FIG. 6, a second write gap 602 may be present in the top pole, the first coil also generating a magnetic flux across the second write gap. FIG. 7 depicts an embodiment in which first, second and third write gaps 302, 602, 702 are present in the top pole, the first coil generating a magnetic flux across the first, second and third write gaps. FIG. 8 depicts an embodiment in which first, second, third and fourth write gaps 302, 602, 702, 704 are present in the top pole, the first coil generating a magnetic flux across the first, second and third write gaps.

The write gaps may be oriented at any angle relative to each other. For example, the first and second write gaps may be oriented at an angle ϕ relative to each other selected from a range of 0 degrees to less than 180 degrees. See FIG. 6.

In another illustrative approach, and with continued reference to FIG. 6. as an example, the first write gap is oriented at an angle β of about 2 to about 90, inclusive, relative to the direction 650 of media travel thereover, while the second write gap may also be oriented at an angle of about 2 to about 90 (which is intended to encompass between about −2 and about −90 degrees) relative to the direction of media travel thereover. While such heads may be used for any type of recording, including data recording, such heads are especially useful for writing servo patterns to a magnetic medium such as a tape.

In other embodiments, the gaps may be oriented for writing data, such as conventional or azimuthal data recording. In one approach, some of the write gaps may be oriented about parallel to each other and may be used for DC erasing tape.

As also shown in FIG. 6, wing portions 504 may be added to this and other embodiments to reduce the possibility of saturation at the ends of the gaps. Preferably, the angles α of the wing portion and central region 502 of the top pole 305 relative to an imaginary line coaxial extending along the gap are about the same.

The gaps in this or any other embodiment do not need to extend to the ends of the pole. Rather, the gaps may be positioned in the face of the top pole. Optional bulbous ends on the gaps improve the uniformity of the flux along the gap, as shown in FIG. 7.

Moreover, in some approaches, centers of the gaps may generally lie along a line oriented parallel to a direction of tape travel thereacross, e.g., are centered on the line. However, in other embodiments, the write gaps have offset centers relative to the direction of tape travel thereacross.

In some embodiments, the first and second write gaps may have about a same track width. In further embodiments, the first and second write gaps have different track widths.

Note also that the gaps need not be centrally located on a given pole region. Rather, it may be desirable for asymmetric placement of a gap in some embodiments.

Several illustrative multi-gap configurations are presented in U.S. patent application Ser. No. 12/141,375 to Biskeborn et al., having title "Tandem Magnetic Writer," filed Jun. 18, 2008, and which is herein incorporated by reference.

In magnetic recording applications such as servo writing, a multiple gap recording head may be used to produce an application specific magnetic pattern. However, when multiple gaps are placed into a magnetic yoke, the resulting deep gap fields exhibit a gap to gap variation in their intensity. This intensity variation ultimately leads to gap to gap variations in the recorded patterns and thus a reduction in the quality of the recorded pattern. Accordingly, in some embodiments, features are present in the head that make the gap to gap field intensity more uniform. In some approaches, some or all of the gaps in a head are designed to increase the field intensity in the selected gaps, such as by having different throat heights. In other approaches, a parallel reluctance path is provided to allow some flux to circumvent the gap. In further approaches, the placement of the coils in the magnetic yoke is set. Combinations of such approaches may also be used. Thus, various designs may include either introducing or removing material at or near the gaps. Note that the approaches presented herein to equalize the gap to gap field variations may be used with any multi-gap head design.

Figure 13A:
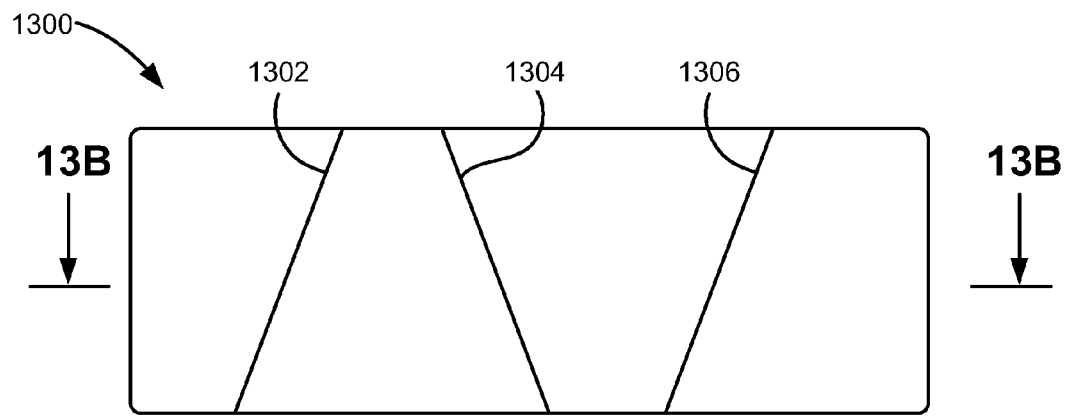
FIG. 13A is a partial tape bearing surface of a head according to one embodiment.

Presented by way of example only, several embodiments applied to a three gap head 1300, as illustratively shown in FIG. 13A, and selected for their manufacturability in a planar head design, are shown in FIGS. 13B-13E, each of which represents a cross sectional view of the head 1300 of FIG. 13A as viewed along plane 13B-13B. The thick arrows represent a general direction of the flow of flux around or across a gap.

Referring first to FIG. 13A, there is shown a head 1300 having three gaps 1302, 1304, 1306. One approach to make the field intensity more uniform across the gaps includes placing a low reluctance path, e.g., made of a ferromagnetic material, near one or more of the gaps for affecting a magnetic field formed at the at least one of the gaps when the source of flux is generating flux. The low reluctance paths have the effect of shunting some of the flux away from the adjacent gap, and shunting that flux to the next portion of the top pole. The net result is that the field formed at the adjacent gap is reduced. Preferably, the low reluctance path equalizes the magnetic field formed at the gap(s) closest thereto with a magnetic field formed at another of the gaps so that the magnetic fields are substantially equivalent, e.g., have very similar writing characteristics.

Figure 13B:
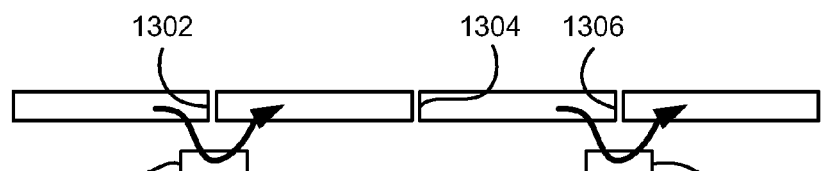
FIG. 13B is a partial cross-sectional view of FIG. 13A taken along Line 13B-13B of FIG. 13A.

Referring to FIG. 13B, low reluctance paths 1310, 1312 are positioned near the outer gaps 1302, 1306. In this approach, the low reluctance paths 1310, 1312 are magnetic shunts located proximate to the gaps but not magnetically connected to the top pole. The low reluctance paths 1310, 1312 have the effect of shunting some of the flux away from the adjacent gap 1302, 1306, and shunting that flux to the next portion of the top pole. The net result is that the field formed at the adjacent gap is reduced. In the embodiment shown in FIG. 13B, this has the effect of equalizing the fields formed at the three gaps. Without the shunts, the middle gap 1304 would tend to exhibit less field than the outer gaps 1302, 1306. The low reluctance paths 1310, 1312 may be formed as an additional layer in the structure using known techniques such as plating, sputtering, plasma vapor deposition, etc. Note that the dimensions of the low reluctance paths 1310, 1312 may be selected based on modeling of the resultant structure, as will be understood by one skilled in the art.

Figure 13C:
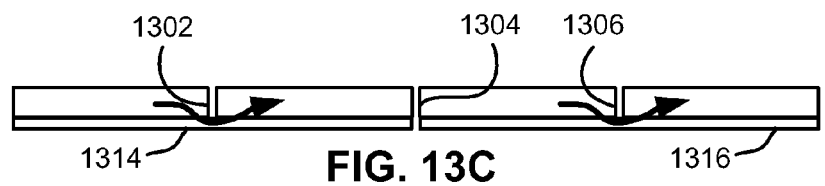
FIG. 13C is a partial cross-sectional view a head according to one embodiment.

Referring to FIG. 13C, low reluctance paths 1314, 1316 are again positioned near the outer gaps 1302, 1306. However, in this approach, the low reluctance paths 1314, 1316 are magnetic shunts located proximate to the gaps and which are magnetically connected to the top pole. For example, the low reluctance paths may be formed from the seed layer that was used when electrodepositing the top pole. The low reluctance paths 1314, 1316 have the effect of allowing flux to circumvent the adjacent gap 1302, 1306. The net result is that the field formed at the adjacent gap is reduced. In the embodiment shown in FIG. 13C, this has the effect of equalizing the fields formed at the three gaps. Without the shunts, the middle gap 1304 would tend to exhibit less field than the outer gaps 1302, 1306. The low reluctance paths 1314, 1316 may be formed as an additional layer in the structure using known techniques such as plating, sputtering, plasma vapor deposition, etc. Note that the dimensions of the low reluctance paths 1314, 1316 may be selected based on modeling of the resultant structure, as will be understood by one skilled in the art.

Figure 13D:
FIG. 13D is a partial cross-sectional view a head according to one embodiment.

In yet another embodiment, a geometry of the magnetic top pole near or at one of the gaps may be different than a geometry of the magnetic pole near or at another of the gaps to equalize fields formed at the gaps when the source of flux is generating flux. In one approach, the geometry of the magnetic pole includes at least two of the gaps having different throat heights. For example, as shown in FIG. 13D, the throat height of the middle gap 1304 is smaller than the throat heights of the outer gaps 1302, 1306. This has the effect of increasing the flux density near the tape bearing surface at the middle gap 1304. The reduced throat height may be defined by a stepped geometry as shown, or other approach.

In another embodiment, the width of one or more of the gaps may be different than the width of the other gap(s). This has the effect of varying the flux density at the various gaps. By appropriate adjustment of the gap widths, the fields at the various gaps can be adjusted.

Figure 13E:
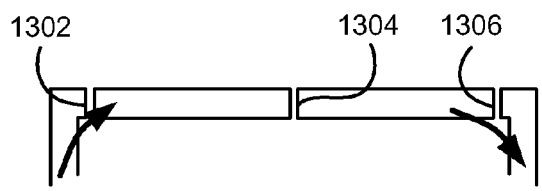
FIG. 13E is a partial cross-sectional view a head according to one embodiment.

In another embodiment, the geometry of the magnetic pole includes a side portion of the pole being close to the one of the gaps for effectively adding a parallel flux path. As shown in FIG. 13E, the side walls of the head may be positioned closer to the outer gaps 1302, 1306 to allow some flux to bypass the gaps.

In a further embodiment, a magnetic device includes a source of flux comprising a coil having multiple turns, and a magnetic yoke coupled to the source of flux. The magnetic yoke may be similar to that shown in FIG. 2, with the bottom portion being offset from the top pole. In an alternate embodiment, the magnetic yoke may be aligned vertically. Other designs may also be used. The magnetic yoke may have a top pole with two or more gaps, where the coil turns have a non-uniform placement in the magnetic yoke for altering a magnetic field formed at the at least one of the gaps during writing. An illustrative embodiment is shown in FIG. 4. The field in a gap depends on the position of the turns of the coil 350. By positioning the coil turns in the yoke to be about the same for each gap, the fields formed at each gap will be about equivalent. In contrast, if the coil turns in the yoke were positioned more towards one of the gaps than the other or more towards one side pole or the other, the former gap would exhibit a higher field.

In one embodiment, a head includes two or more independently addressable write gaps, where the gaps preferably lie along a line oriented parallel to a direction of tape travel thereacross, i.e., having at least portions thereof aligned in a direction parallel to a direction of media travel thereover. While such heads may be used for any type of recording, including data recording, the heads are especially useful for writing servo patterns to a magnetic medium such as a tape.

In one embodiment, a multi-gap head is part of a plurality of heads designed to work together such as in a tandem head. FIG. 9A illustrates a simple tandem head 800 according to one embodiment. Though each head has only a single gap, it should be understood that each head may have multiple gaps. FIG. 9B is a cross sectional view of FIG. 9A taken along Line 9B-9B of FIG. 9A. As shown, the tandem head has top poles 305 with first and second write gaps 302, 304 therein, and independently addressable first and second coils. The first coil is operative to cause a magnetic flux to emanate from the first gap 302. The second coil is operative to cause a magnetic flux to emanate from gap 304.

The write gaps 302, 304 in this and other embodiments may be concurrently formed. This has the advantage of allowing precise alignment of the write gaps. Also, the various regions of the pole 305 may be concurrently formed in this and other embodiments.

More information about tandem head configurations and operation is presented in U.S. patent application Ser. No. 12/141,375 to Biskeborn et al., having title "Tandem Magnetic Writer," filed Jun. 18, 2008, and which has been incorporated by reference.

Magnetic tape uses a written servo pattern to indicate the lateral position on tape. This servo pattern is used to indicate the lateral position, on tape, of the various written tracks. The servo pattern is not perfect due to variations in tape velocity and lateral tape motion in the servo writer system during servo writing. The component of the servo pattern due to the velocity variations and lateral motion is termed the 'written in' component and interferes with capabilities of the track following actuator in the drive. For example, components of the 'written in' servo can be incorrectly interpreted by the track following actuator as lateral positioning error and so cause the head to move in response thus resulting in mistracking. Greater trackfollowing accuracy becomes more important as written tracks get narrower. Hence 'written in' servo noise limits the ultimate track pitch attainable in magnetic tape recording.

In use, some of the embodiments described herein may be used as a servo writer using methods such as those described in U.S. patent application Ser. No. 12/141,363 to Biskeborn et al., having title "Systems and Methods for Writing Servo Patterns," filed Jun. 18, 2008, and which is herein incorporated by reference.

FIGS. 10A-C illustrate one general method for forming a writer. Conventional processing may be used to form the various parts. Moreover, additional layers such as insulating layers, masks, etc. may be added and/or removed. Note that some underlying layers are shown in shadow in FIG. 10B and 10C.

Referring to FIG. 10A, a bottom pole 303 and at least portions of the first coil 306 are formed above any conventional substrate. The coil is preferably electrically isolated from the bottom pole. Preferably, a first magnetic field is applied during formation of the bottom pole. The first magnetic field is preferably oriented about perpendicular to a long axis 1002 of the bottom pole. This tends to orient the magnetic domains in the direction of the applied magnetic field, which is orthogonal to the long axis, thereby improving switching speed by causing rotation of domain magnetization rather than motion of domain walls, which is a slower process. Note that the long axis of a component lies generally along a primary path of magnetic flux as it travels through the component.

Referring to FIG. 10B, side poles 310 are formed. The coil 306 is also completed. The side poles provide the flux path between the top and bottom poles in the completed device. Preferably, a second magnetic field is applied during formation of the side poles. The second magnetic field is preferably oriented about perpendicular to a long axis 1004 of one or both side poles.

Referring to FIG. 10C, a top pole 305 is formed above a plane extending through the bottom pole and parallel to a plane of deposition of the bottom pole, where the top pole is at least partially offset from the bottom pole in a direction parallel to a plane of deposition of the top pole. Preferably, a third magnetic field is applied during formation of the top pole. The first magnetic field is preferably oriented about perpendicular to a long axis 1006 of the top pole. The longitudinal axes of the top and bottom poles are preferably oriented about parallel to each other, but need not be. Also, the longitudinal axes of the side poles are preferably not parallel to the long axis of the top pole, but could be.

As shown in FIG. 10C, at least one write gap 302 is formed in the top pole. FIGS. 11A-C and 12A-C illustrates different methods to form write gaps. Of course, any other suitable method may be used.

Figure 11A:
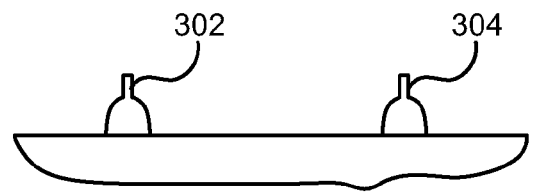
FIGS. 11A-C illustrate another method for forming a writer.
Figure 11B:
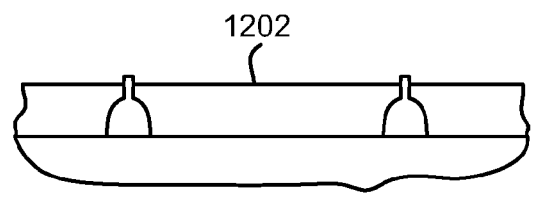
Figure 11C:
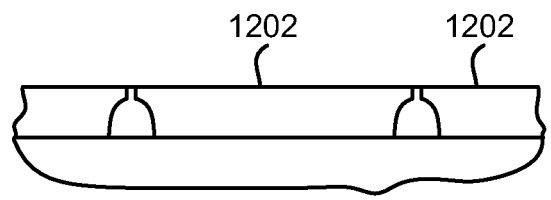

FIGS. 11A-C illustrate one method for forming a writer having independently addressable write gaps. Conventional processing may be used to form the various parts. Referring to FIG. 11A, first and second write coils 306, 308 are formed. First and second write gaps 302, 304 are also formed. Referring to FIG. 11B, material is deposited for concurrently forming write pole regions 1202, which may or may not be defined at this point. Referring to FIG. 11C, the structure is planarized.

Figure 12A:
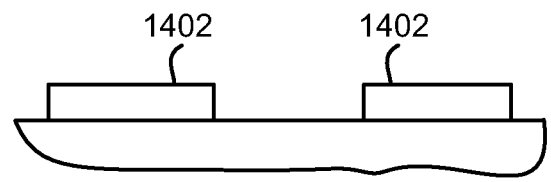
FIGS. 12A-C illustrate yet another method for forming a writer.
Figure 12B:
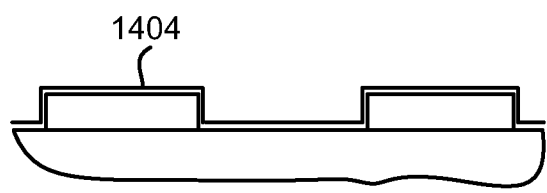
Figure 12C:
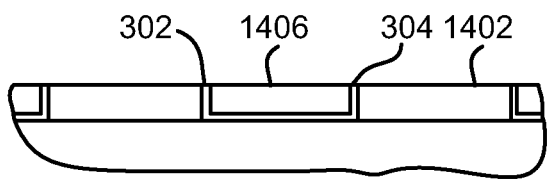

FIGS. 12A-C illustrate another method for forming a writer. Again, processing may be used to form the various parts. Referring to FIG. 12A, first and second write coils 306, 308 are formed. Write pole regions 1402 are also formed. Write gap material 1404 is formed over the write pole regions, as shown in FIG. 12B. Further processing may be performed prior to formation of a common write pole region 1406 adjacent first and second write gaps 302, 304, as shown in FIG. 12C.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic device, comprising:
   a source of flux;
   a magnetic pole magnetically coupled to the source of flux, the magnetic pole having two or more gaps each configured to write data to a magnetic medium; and
   a low reluctance path positioned towards at least one of the gaps and not positioned towards at least one other of the gaps for affecting a magnetic field formed at the at least one of the gaps when the source of flux is generating flux.

2. A device as recited in claim 1, wherein the low reluctance path is a magnetic shunt located proximate to the at least one of the gaps but not directly magnetically connected to the pole.

3. A device as recited in claim 1, wherein the low reluctance path is a magnetic shunt located proximate to the at least one of the gaps and magnetically connected to the pole via direct contact therewith.

4. A device as recited in claim 3, wherein the magnetic shunt is a magnetic seed layer of the pole.

5. A device as recited in claim 1, wherein the device is constructed to operate with a magnetic medium running along the plane of deposition of the pole.

6. A device as recited in claim 5, wherein the gaps are laterally displaced from the source of flux.

7. A device as recited in claim 1, wherein the device is constructed to operate with a magnetic medium running orthogonal to a plane of deposition of the pole.

8. A device as recited in claim 1, wherein the low reluctance path equalizes the magnetic field formed at the at least one of the gaps with a magnetic field formed at the at least one other of the gaps so that the magnetic fields are substantially equivalent.

9. A device as recited in claim 1, wherein the gaps are configured to write servo patterns on a magnetic medium.

10. A device as recited in claim 9, wherein the longitudinal axes of the at least two of the gaps are oriented at an angle relative to each other of between 2 degrees and 90 degrees.

11. A device as recited in claim 9, wherein the longitudinal axes of the at least two of the gaps are oriented at an angle relative to a direction of tape travel thereacross of 0 degrees to 88 degrees.

12. A device as recited in claim 9, wherein the pole and gaps are configured to simultaneously create magnetic fields at all of the gaps upon application of flux to the pole by the source of flux.

13. A device as recited in claim 1, wherein the pole is magnetically coupled to the source of flux, the pole and gaps being configured to create magnetic fields at each of the gaps upon application of flux to the pole by the source of flux, the fields being sufficient to write data to a magnetic medium.

14. A device as recited in claim 13, wherein the pole and gaps are physically configured to create magnetic fields at all of the gaps upon application of flux to the pole by the source of flux, the fields being sufficient to write data to a magnetic medium.

15. A device as recited in claim 1, wherein the magnetic pole has three gaps.

16. A device as recited in claim 1, wherein the magnetic pole has more than three gaps.

17. A device as recited in claim 1, wherein longitudinal axes of at least two of the gaps are oriented at an angle relative to each other of between 2 degrees and 90 degrees.

18. A device as recited in claim 1, wherein longitudinal axes of at least two of the gaps are oriented at an angle relative to a direction of tape travel thereacross of 0 degrees to 88 degrees.

19. A magnetic storage drive system, comprising:
    the device as recited in claim 1;
    a drive mechanism for passing a magnetic medium over the head; and
    a controller in communication with the head.

20. A magnetic device,
    a source of flux;
    a magnetic pole coupled to the source of flux, the magnetic pole having two or more gaps; and
    a low reluctance path positioned towards at least one of the gaps and not positioned towards at least one other of the gaps for affecting a magnetic field formed at the at least one of the gaps when the source of flux is generating flux,
    wherein the pole and gaps are physically configured to simultaneously create magnetic fields at all of the gaps upon application of flux to the pole by the source of flux, the fields being sufficient to write data to a magnetic medium.

* * * * *